United States Patent [19]

Sekiguchi

[11] Patent Number: 5,034,953
[45] Date of Patent: Jul. 23, 1991

[54] LASER DEVICE CAPABLE OF MAKING A TEMPERATURE DISTRIBUTION UNIFORM IN A SLAB-SHAPED LASER MEDIUM

[75] Inventor: Hiroshi Sekiguchi, Tokyo, Japan
[73] Assignee: Hoya Corporation, Tokyo, Japan
[21] Appl. No.: 373,803
[22] Filed: Jun. 29, 1989
[30] Foreign Application Priority Data
Jun. 30, 1988 [JP] Japan ................... 63-164749
[51] Int. Cl.$^5$ ................................. H01S 3/04
[52] U.S. Cl. ........................ 372/34; 372/33; 372/66; 372/92
[58] Field of Search .............. 372/34, 66, 92, 65, 372/33

[56] References Cited

U.S. PATENT DOCUMENTS

| 4,555,786 | 11/1985 | Byer ....................... 372/66 |
| 4,789,988 | 12/1988 | Trost ...................... 372/66 |
| 4,833,682 | 5/1989 | Byer et al. ............... 372/34 |

Primary Examiner—Léon Scott, Jr.
Attorney, Agent, or Firm—Ladas & Parry

[57] ABSTRACT

In a laser device for producing a laser beam along a first predetermined direction by exciting a slab-shaped laser medium by an excitation member, a reciprocating motion is carried out along a second predetermined direction transverse to the first predetermined direction and is divided into a plurality of cycles which have different amplitudes. Both edge zones of the slab-shaped laser medium are excited and heated by the excitation member during a selected one of the cycles while they are not excited during the remaining cycles. Thus, heat accumulated in the edge zones is diffused and dissipated by intermittently heating the edge zones. The slab-shaped laser medium may be reciprocated relative to the excitation member. Alternatively, the excitation member may be reciprocated relative to the slab-shaped laser medium.

12 Claims, 9 Drawing Sheets

LASER DEVICE CAPABLE OF MAKING A TEMPERATURE DISTRIBUTION UNIFORM IN A SLAB-SHAPED LASER MEDIUM

BACKGROUND OF THE INVENTION

This invention relates to a solid-state laser device for use in generating a laser beam by exciting a slab-shaped laser medium and a method of exciting the slab-shaped laser medium.

A conventional solid-state laser device of the type described has been disclosed by Robert L. Byer et al in U.S. Pat. No. 4,555,786. The laser device comprises a slab-shaped laser medium having a pair of principal surfaces and an excitation member for exciting the slab-shaped laser medium to generate a laser beam along a predetermined direction which will be called a first predetermined direction. The excitation member comprises a pair of excitation units opposite to each other and spaced apart from each other with a space gap therebetween. Each excitation unit comprises an excitation lamp extended along the first predetermined direction and a reflector surrounding the excitation lamp. The slab-shaped laser medium is disposed within the space between the excitation units with the principal surfaces directed towards the excitation lamps.

In this laser device, the slab-shaped laser medium is reciprocated within said space by the use of a driving member along a second predetermined direction transverse to the first predetermined direction. Such a reciprocating motion is reversely turned at two turning points. As a result, the slab-shaped laser medium is locally illuminated by the excitation lamps along the first predetermined direction in a stripe shape on both of the principal surfaces. This means that the slab-shaped laser medium is partially excited at an excited portion by the excitation lamps along the first predetermined direction to generate the laser beam through the excited region and is locally heated at the excited region by excitation light.

Inasmuch as the excited region is moved forwards and backwards along the second predetermined direction, as mentioned before, thermal energy is diffused all over the slab-shaped laser medium. Accordingly, it might be possible to make a thermal distribution uniform in the slab-shaped laser medium. Stated otherwise, a temperature rise may be reduced which might appear locally and entirely in the slab-shaped laser medium. This results in a reduction of a thermal expansion and a thermal distortion in the slab-shaped laser medium and enables use of laser glass which has a low thermal conductivity. In addition, such a uniform thermal distribution also enables pulse oscillation of a high repetition frequency.

According to the inventor's experimental studies, it has been found that the temperature distribution is not actually completely uniform in the slab-shaped laser medium. More particularly, a phenomenon has been found such that a temperature of the slab-shaped laser medium becomes high at portions adjacent to the turning points of the reciprocating motion as compared with the remaining portion of the slab-shaped laser medium. Therefore, it is difficult in practice to realize a complete uniform temperature distribution and to completely avoid the thermal expansion and the thermal distortion.

SUMMARY OF THE INVENTION

It is an object of this invention to provide a laser device which is capable of making a temperature distribution actually uniform in a slab-shaped laser medium so as to favorably reduce thermal expansion and thermal distortion.

It is another object of this invention to provide a method of exciting the slab-shaped laser medium, which is capable of uniformly heating the entire slab-shaped laser medium.

According to one aspect of this invention, there is provided a laser device for use in producing a laser beam in a first predetermined direction by exciting a slab-shaped laser medium by an excitation lamp. The slab-shaped laser medium has a pair of principal surfaces opposite each other, a pair of side surfaces parallel to each other and to the first predetermined direction, and a pair of light emission surfaces which extend along a second predetermined direction transverse to the first predetermined direction and which are contiguous with the principal surfaces and the side surfaces. The slab-shaped laser medium undergoes a reciprocating motion along the second predetermined direction relative to the excitation lamp to produce the laser beam along the first predetermined direction. The reciprocating motion is specifiable by an amplitude from a center position of the slab-shaped laser medium along the second predetermined direction. The laser device comprises moving means coupled to a selected one of the slab-shaped laser medium and the excitation lamp for reciprocally moving the selected one of the slab-shaped laser medium and the excitation lamp relative to the other along the second predetermined direction and control means coupled to the moving means for controlling the moving means to reciprocally move the selected one of the slab-shaped laser medium and the excitation lamp by the moving means in the second predetermined direction so that the amplitude of the reciprocating motion is variable.

According to another aspect of this invention, there is provided a method of exciting a slab-shaped laser medium by an excitation lamp to produce a laser beam along a first predetermined direction. The slab-shaped laser medium has a pair of principal surfaces opposite each other, a pair of side surfaces parallel to each other and to the first predetermined direction, and a pair of light emission surfaces which extend along a second predetermined direction transverse to the first predetermined direction and which are contiguous with the principal surfaces and the side surfaces. The slab-shaped laser medium undergoes a reciprocating motion along the second predetermined direction relative to the excitation lamp to produce the laser beam along the first predetermined direction. The reciprocating motion is specifiable by an amplitude from a center position of the slab-shaped laser medium along the second predetermined direction. The method comprises the steps of producing a sequence of control signals so that the amplitude of the reciprocating motion becomes variable and reciprocally moving the selected one of the slab-shaped laser medium and the excitation lamp relative to the other along the second predetermined direction in response to the control signal sequence.

DESCRIPTION OF THE PREFERRED EMBODIMENTS

Figure 1:
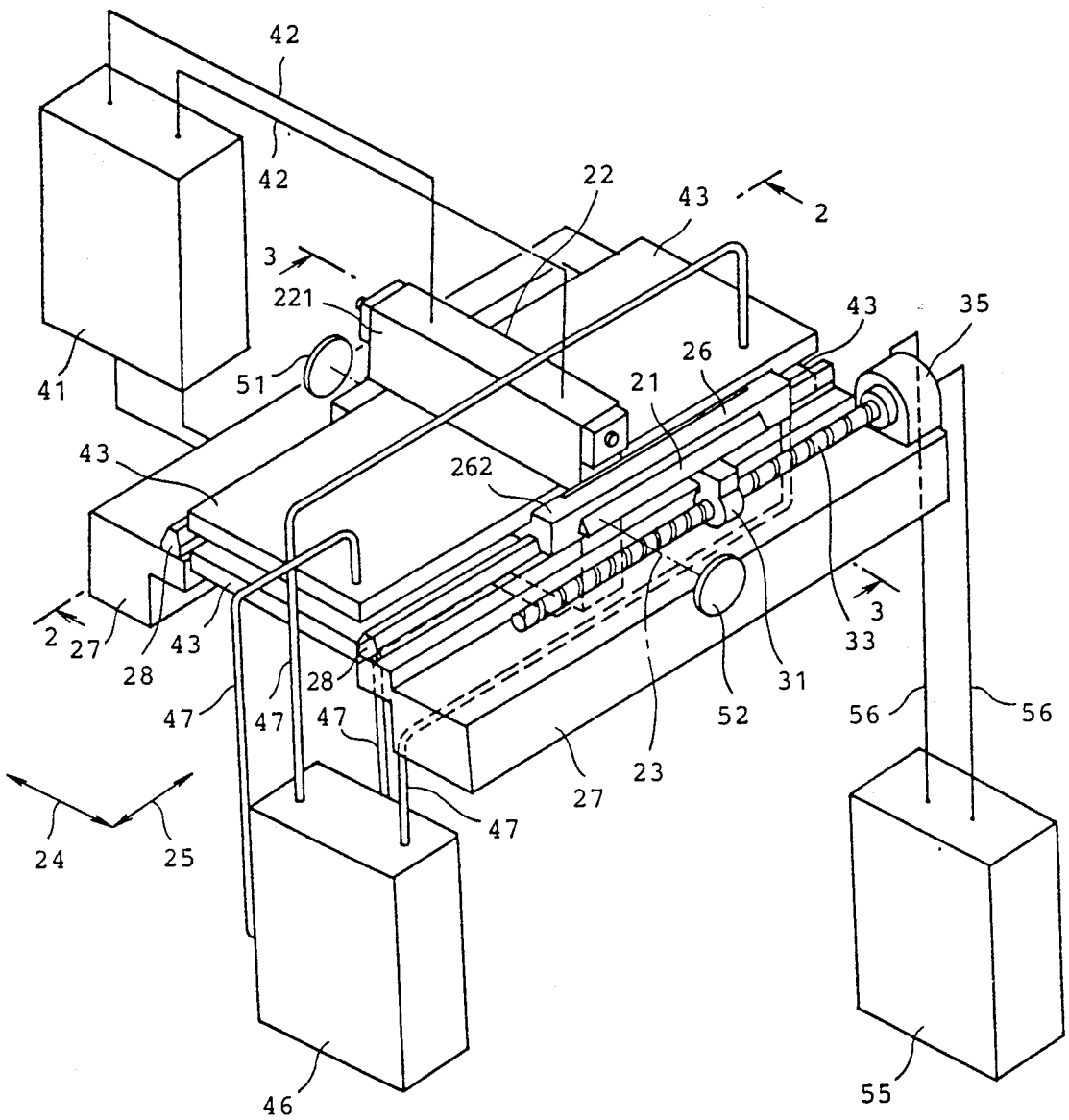
FIG. 1 is a schematic perspective view of a laser device according to a first embodiment of this invention.
Figure 2:
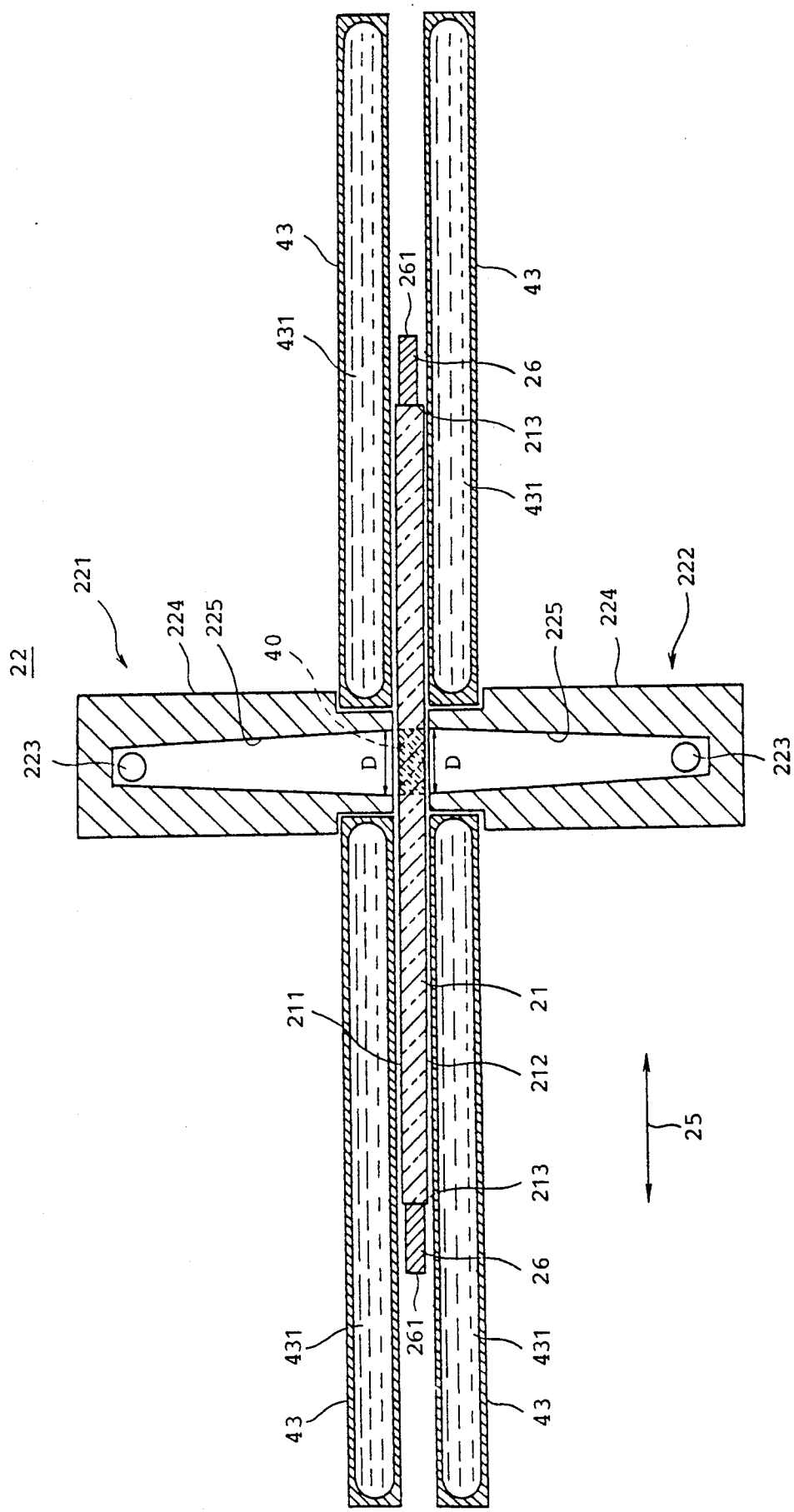
FIG. 2 is a sectional view taken along line 2—2 illustrated in FIG. 1.
Figure 3:
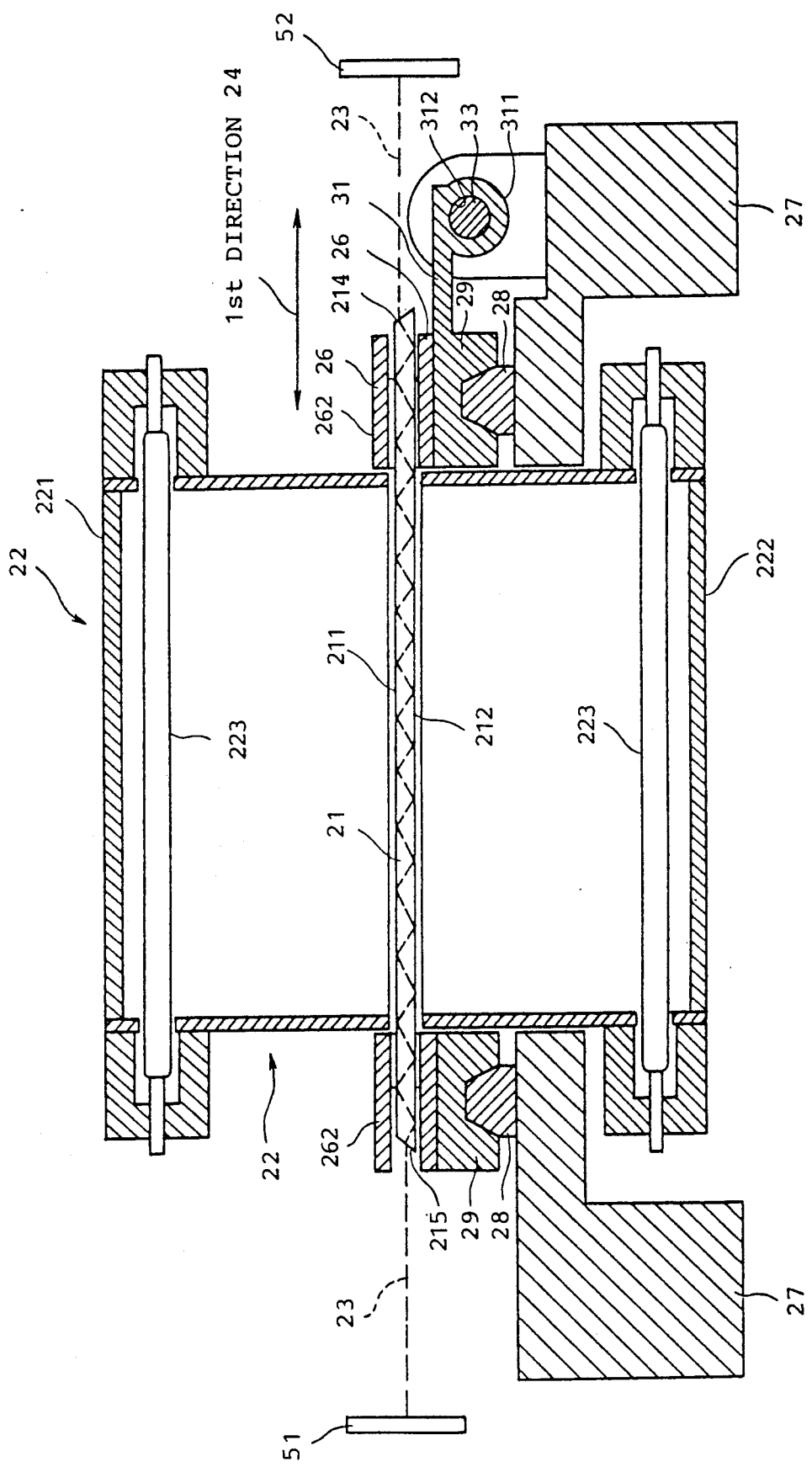
FIG. 3 is another sectional view taken along a line 3—3 illustrated in FIG. 1.

Referring to FIGS. 1 through 3, a solid-state laser device according to a preferred embodiment of this invention comprises a slab-shaped laser medium 21 and an excitation member 22 for exciting the slab-shaped laser medium 21 to generate a laser beam 23 in a first predetermined direction depicted by a line segment 24 in FIGS. 1 and 3. The slab-shaped laser medium 21 may be formed by a laser glass block 225 mm long, 225 mm wide, and 6 mm thick and may be, for example, LHG-5 which is manufactured and sold by Hoya Corporation and which comprises 6% Nd by weight, as a laser activator. Specifically, the slab-shaped laser medium 21 has first and second principal surfaces 211 and 212 (best shown in FIG. 3) directed upwards and downwards in FIGS. 1 through 3, respectively, a pair of side surfaces 213 (FIG. 2) opposite each other and contiguous with the first and the second principal surfaces 211 and 212, and first and second light emission surfaces 214 and 215 (FIG. 3) which extend along a second predetermined direction 25 transverse to the first predetermined direction 24 and through which the laser beam 23 is emitted in the first predetermined direction. The first and the second light emission surfaces 214 and 215 are oblique to the first and the second principal surfaces 211 and 212 at Bragg angles which may be about 33 degrees.

In FIGS. 1 through 3, the illustrated slab-shaped laser medium 21 is supported by a frame member 26 made of an aluminum alloy. In this case, the slab-shaped laser medium 21 is fitted into the frame member 26. The frame member 26 is composed of a pair of side bars 261 (FIG. 2) extended along the first predetermined direction 24 in parallel to each other and a pair of lateral bars 262 (FIGS. 1 and 3) extended along the second predetermined direction in parallel to each other. The side bars 261 are attached to the side surfaces of the slab-shaped laser medium 21, as shown in FIG. 2 while the slab-shaped laser medium 21 is extended through the lateral bars 262 with the first and the second light emission surfaces 214 and 215 protruded from the lateral bars 262, as shown in FIGS. 1 and 3.

Two pedestals 27 are located with a space therebetween and secured to an external support (not shown). A linear guide 28 is fixed to each of the pedestals 27 along an inner edge adjacent to the space between the pedestals, as best shown in FIG. 3 and each guide extends rectilinearly in the second predetermined direction 25. A pair of linear bearings 29 is fixed under the lateral bars 262 of the frame member 26, respectively, and slidably fitted to the linear guides 28, respectively. With this structure, the slab-shaped laser medium 21 can be reciprocated in the second predetermined direction 25 together with the frame member 26 by sliding the linear bearings 29 on the linear guides 28. For this purpose, a drive rod 31 projects in the second predetermined direction 25 from a center region of one of the linear bearings 29 outwards of the slab-shaped laser medium 21. The center region of the one linear bearing 29 corresponds to a center portion of the slab-shaped laser medium 21. The drive rod 31 has a projection 311 in which a thread hole 312 is form. The thread hole 312 is defined by an inner surface on which thread grooves are formed.

In FIGS. 1 and 3, a threaded bar 33 has a helical ridge which is rotatably interlocked or screwed with the thread grooves of the thread hole 312 and is coupled to a servomotor 35 at an end of the threaded bar 33. The threaded bar 33 is rotated by the servomotor 35 35 and the rotation of the threaded bar 33 produces the reciprocating motion of the slab-shaped laser medium 21 along the second predetermined direction 25. This means that the rotation of the threaded bar 33 is converted into a linear motion of the slab-shaped laser medium 21.

In this connection, a combination of the servomotor 35, the threaded bar 33, the frame member 26, the linear guides 28, and the drive rod 31 may be collectively called a movement member for reciprocally moving the slab-shaped laser medium 21 relative to the excitation member 22 along the second predetermined direction 25.

In FIGS. 1 through 3, the excitation member 22 comprises an upper excitation unit 221 and a lower excitation unit 222 which are placed over and under the slab-shaped laser medium 21, respectively, and which face each other through the slab-shaped laser medium 21. The upper and the lower excitation units 221 and 222 are similar in structure and operation to each other except that the upper excitation unit 221 is symmetrical with the lower excitation unit 222 with respect to the slab-shaped laser medium 21. Therefore, the following description will be mainly restricted to the upper excitation unit 221 alone. Each of the excitation units 221 and 222 comprises an excitation lamp 223 which may be a flash lamp, such as a xenon lamp and which are disposed along the first predetermined direction 24 in parallel to the first principal surface 211, as shown in FIGS. 1 and 3. The xenon lamp may be a commercial lamp 6F6 manufactured and sold by ILC. Such a xenon lamp has an inner diameter of about 6 mm, an arc length of about 150 mm, and a xenon gas pressure of 450 Torr.

In the upper excitation unit 221, the excitation lamp 223 is surrounded by a lamp case 224 which has an outer surface of a rectangular parallelepiped configuration and an inner surface defining an inner cavity or prismal space, as shown in FIG. 2. The inner cavity is closed at an outer end thereof and opened at an inner end thereof to form an open end. The open end has a width D of, for example, 2 cm along the second predetermined direction 25 and is close to each of the first and the second principal surfaces 211 and 212 with an internal gap left between the open end and each principal surface 211 and 212. The internal gap may be, for example, 200 microns wide.

On the inner surface of the lamp case 224, a reflector 225 is formed to direct light from the excitation lamp 223 towards the first principal surface 211. As a result, the light is incident onto the first principal surface 211 through the open end. Thus, the first principal surface 211 is locally illuminated by the excitation lamp 223. Likewise, the second principal surface 212 is locally illuminated by the excitation lamp 223 of the lower excitation unit 222. With this structure, the slab-shaped laser medium 21 is illuminated in stripe shapes of the width D along the first predetermined direction 24 and is locally excited within each of stripe shape zones that will be called excited zones 40 in FIG. 2.

A power source 41 is connected to each of the excitation lamps 223 through a pair of conductors 42, as illustrated in FIG. 1, and develops a pulse of a high voltage. The power source 41 has a maximum output of 12 kw.

As best shown in FIG. 2, four cooling units (depicted at 43) are adjacent to the upper and the lower excitation units 221 and 222 and divided into an upper set and a lower set each of which is composed of two cooling units. The two cooling units 43 of the upper set are arranged on both sides of the upper excitation unit 221 along the second predetermined direction with a first gap left therebetween. The first gap may be substantially equal to the gap between the upper and the lower excitation units 221 and 222. Likewise, two cooling units 43 of the lower set are located on both sides of the lower excitation unit 222 with a second gap which is left therebetween and which is substantially equal to the first gap. Under the circumstances, the slab-shaped laser medium 21 is movable along the second predetermined direction 25 through the first and the second gaps left between the two cooling units 43 and is preferably always between the first and the second gaps even when the slab-shaped laser medium 21 is reciprocated along the second predetermined direction 25. Therefore, each set of the cooling units 43 entirely covers a movable zone of the slab-shaped laser medium 21. Each of the cooling units 43 is similar in structure to one another and may be a metallic cooling plate which is 225 mm long and 225 mm wide. Each cooling unit 43 has an envelope defining a hollow space through which a coolant, such as water, is circulated, as shown at 431 in FIG. 2.

In FIG. 1, each of the cooling units 43 is supplied from a cooling pump 46 with the coolant through a conduit 47 and returned back to the cooling pump 46.

As mentioned before, the internal gap of 200 microns is formed between each excitation unit 221 and 222 and the slab-shaped laser medium 21 and is extended between the slab-shaped laser medium 21 and each cooling unit 43. In the example illustrated, the internal gap is filled with a helium gas having a thermal conductivity which is about six times the thermal conductivity of air.

The illustrated slab-shaped laser medium 21 is excited by the upper and the lower excitation units 221 and 222 which are mechanically fixed to each other. Consequently, the laser beam 23 is generated from an excited zone of the slab-shaped laser medium 21. Inasmuch as the upper and the lower excitation units 221 and 222 are kept unmoved while the slab-shaped laser medium 21 is moved along the second predetermined direction 25, the excited zone of the slab-shaped laser medium 21 is not moved, the laser beam 23 is generated from a constant position between the upper and the lower excitation units 221 and 222. The laser beam 23 generated from the slab-shaped laser medium 21 is repeatedly reflected between a reflection mirror 51 and a translucent mirror 52 (FIGS. 1 and 3) both of which perpendicularly intersect the laser beam 23 and which are mechanically fixed by a support member (not shown).

Referring back to FIG. 1, the servomotor 35 is supplied with a sequence of control signals from a controller 55 through a pair of conductor lines 56.

The servomotor 35 may be a reversible motor which can be selectively rotated in forward and reverse directions. In order to selectively forwardly and reversely rotate the servomotor 35, the servomotor 35 is selectively supplied as the control signal sequence with a sequence of positive pulses or with a sequence of negative pulses. In the example being illustrated, it is assumed that the servomotor 35 rotates one single complete rotation in response to the pulses which are equal in number to 2000 and that the slab-shaped laser medium 21 is moved by 1 cm forwards or backwards during one single complete rotation. Therefore, the slab-shaped laser medium 21 is driven, for example, by 10 cm per second along the second predetermined direction 25 when 20000 pulses/second are given to the servomotor 35. In this case, the servomotor 35 rotates ten complete rotations per second.

Temporarily referring to FIG. 4, the controller 55 is implemented by a combination of a microprocessor 58 operable in accordance with a program and a driver circuit 59 coupled to the microprocessor to distribute the control signal sequence (positive or negative pulses) to the servomotor 35 and to reciprocate the slab-shaped laser medium 21 in a manner to be described later. In this even, the microprocessor 58 comprises a pulse generator 61 for controllably producing the pulse sequence having a pulse interval of the pulses, namely, a pulse rate variable from a slow rate to a high rate of 20000 pulses/second, a counter 62 for counting the pulses, and a control unit 63 for executing the program to control the pulse generator 61, the counter 62, and the driver circuit 59 and to monitor the counter 62. p Referring to FIGS. 5(a) through (j) together with FIGS. 1 through 4, the slab-shaped laser medium 21 is divided in the second predetermined direction 25 into a plurality f partial zones (depicted at Za through Zg) between both the side surfaces of the slab-shaped laser medium 21. Each of the partial zones has a width of, for example, 2 cm substantially equal to the open end of each of the upper and the lower excitation units 221 and 222 and includes a center partial zone Zg and a pair of edge zones Za and Zf nearest to the side surfaces. Moreover, it is assumed that the center partial zone Zg of the slab-shaped laser medium 21 is situated between the upper and the lower excitation units 221 and 222 in an initial state of the reciprocating motion of the slab-shaped laser medium 21, as shown in FIG. 5(a). A reference position of the slab-shaped laser medium 21 is determined at a middle position of the center partial zone Zg and is spaced from each side surface by 112.5 mm in the example being illustrated. In this connection, the center partial zone Zg is at first excited by the upper and the lower excitation units 221 and 222, as shown by dotted hatch lines in FIG. 5(a), when the upper and the lower excitation units 221 and 222 are energized. As a result, the laser beam 23 illustrated in FIG. 1 is generated from the center partial zone Zg. As well known in the art, the laser beam 23 travels within the slab-shaped laser medium 21 by repeating reflections between the first and the second principal surfaces 211 and 212 along the first predetermined direction 24, as illustrated in FIG. 2. Thus, a zigzag optical path is formed in the slab-shaped laser medium 21.

Figure 4:
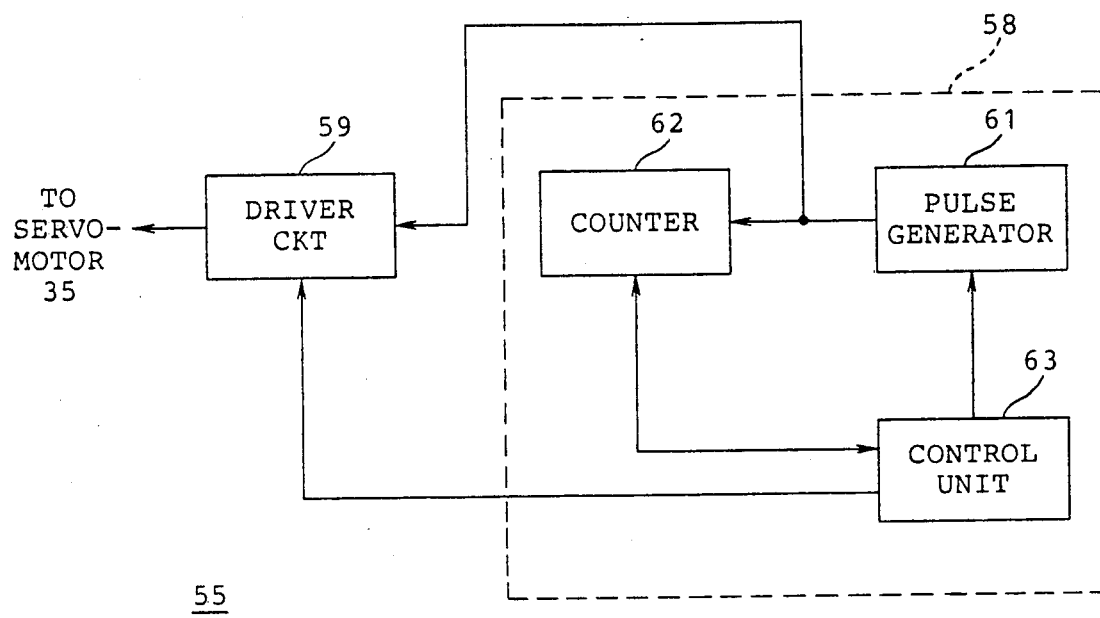
FIG. 4 is a block diagram of a controller for use in the laser device illustrated in FIG. 1.

Subsequently, the slab-shaped laser medium 21 is moved leftwards, as shown in FIG. 5(b) under control of the controller 55 (FIGS. 1 and 4). More specifically, the pulse generator 61 produces the pulses which have the pulse rate of 20000 per second and which are sent in the form of the positive pulses through the driver circuit 59 (FIG. 4) to the servomotor 35. The resultant slab-shaped laser medium 21 is driven at a speed of 10 cm/second by the servomotor 35 supplied with the positive pulses, as illustrated in FIG. 5(b). The positive pulses are successively counted by the counter 62 (FIG. 4) which is monitored by the control unit 63. When the reference position is moved leftwards by 975 mm, that is, the positive pulses are counted to 19500, the positive pulses are stopped by the control unit 63 (FIG. 4). On stopping production of the positive pulses, the slab-shaped laser medium 21 is moved at an acceleration of, for example, 100 cm/s$^2$ and is also somewhat moved leftwards, for example, by 5 mm for 0.1 second even after the positive pulses are stopped.

Figure 5:
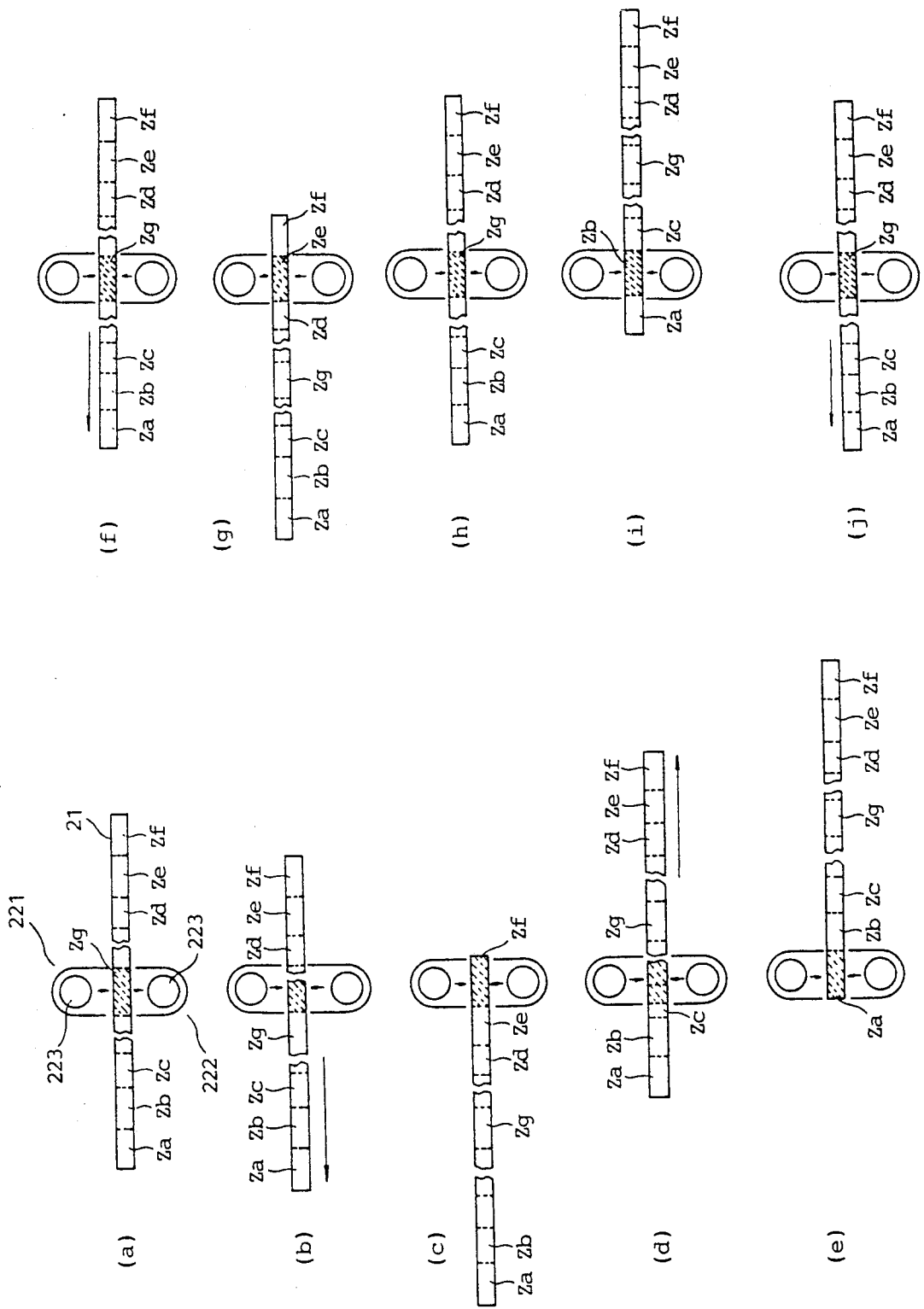
FIGS. 5(a) through (j) are schematic elevational views for use in describing operation of the laser device illustrated in FIGS. 1 through 3.

The upper and the lower excitation units 221 and 222 are placed over the edge zone Zf which has a zone center position spaced by 10 mm from the nearest side surface of the slab-shaped laser medium 21, as shown in FIG. 5(c). The zone center position of the edge zone Zf may be called a turning point of the reciprocating motion. From this fact, it is understood that the reference position of the slab-shaped laser medium 21 is moved by 102.5 mm from the initial state (FIG. 5(a)) leftwards in FIG. 5 and that the reciprocating motion has an amplitude of 102.5 mm.

After the slab-shaped laser medium 21 is driven by the servomotor 35 until the edge zone Zf is directed to the upper and the lower excitation units 221 and 222, as shown in FIG. 5(c), the slab-shaped laser medium 21 is reversely driven by the servomotor 35, as illustrated in FIG. 5(d). In this case, the servomotor 35 is supplied with the negative pulses having the pulse rate of 20000/second from the controller 55. As a result, the slab-shaped laser medium 35 is moved at a speed of 100 mm/second rightwards in FIG. 5 with the partial zones Ze, Zd, Zg, Zc, and Zb successively excited by the upper and the lower excitation units 221 and 222.

Like in FIG. 5(c), the negative pulses are stopped after the partial zone Zb is excited and the slab-shaped laser medium 21 is stopped at a zone center position of the edge zone Za. At any rate, the slab-shaped laser medium 21 is stopped with the edge zone Za illuminated by the upper and the lower excitation units 221 and 222, as shown in FIG. 5(e). thus, the zone center position of the edge zone Za may be called another turning point of the reciprocating motion and is spaced by 103.5 mm from the reference position.

Subsequently, the slab-shaped laser medium 21 is moved leftwards, as illustrated in FIG. 5(f) at a speed of 100 mml/second. When the center zone Zg is located between the upper and the lower excitation units 221 and 222, a first cycle of the reciprocating motion is completed. It is to be noted that the first cycle has the amplitude of 102.5 mm with respect to the center position of the slab-shaped laser medium 35. A second cycle of the reciprocating motion is continuously started after the first cycle is finished.

When the slab-shaped laser medium 21 is driven until the upper and the lower excitation units 221 and 222 illuminates the partial zone Ze adjacent to the edge zone Zf, the slab-shaped laser medium 21 is stopped, as shown in FIG. 5(g). A zone center position of the partial zone Ze is remote by 925 mm from the reference position of the slab-shaped laser medium 21. This means that the amplitude of the second cycle is equal to 925 mm and is therefore different from that of the first cycle.

After the partial zone Ze is illuminated by the upper and the lower excitation units 221 and 222, the slab-shaped laser medium 21 is driven through the center zone Zg rightwards, as shown in FIG. 5(h), at a speed of 100 mm/second.

When the slab-shaped laser medium 21 is moved to a position where the upper and the lower excitation units 221 and 222 illuminates the partial zone adjacent to the edge zone Za, the slab-shaped laser medium 21 is stopped, as illustrated in FIG. 5(i), at a zone center position of the partial zone Zb spaced 925 mm from the reference position and is thereafter moved leftwards, as shown in FIG. 5(j).

As mentioned before, the reciprocating motion of the slab-shaped laser medium 21 is divided into the first and the second cycles that have amplitudes different from each other. In other words, the reciprocating motion is turned in a reverse direction at the partial zones arranged in the order of Zf, Za, Ze, and Zb and is thereafter repeated again and again. According to this reciprocating motion, the edge zones Za and Zf are excited and heated at every other one of the two cycles. Therefore, heat accumulated in the edge zones Za and Zf during the first cycle is diffused and dissipated during the second cycle. This shows that it is possible to make a temperature distribution of the slab-shaped laser medium 21 uniform in comparison with the conventional method.

Figure 6:
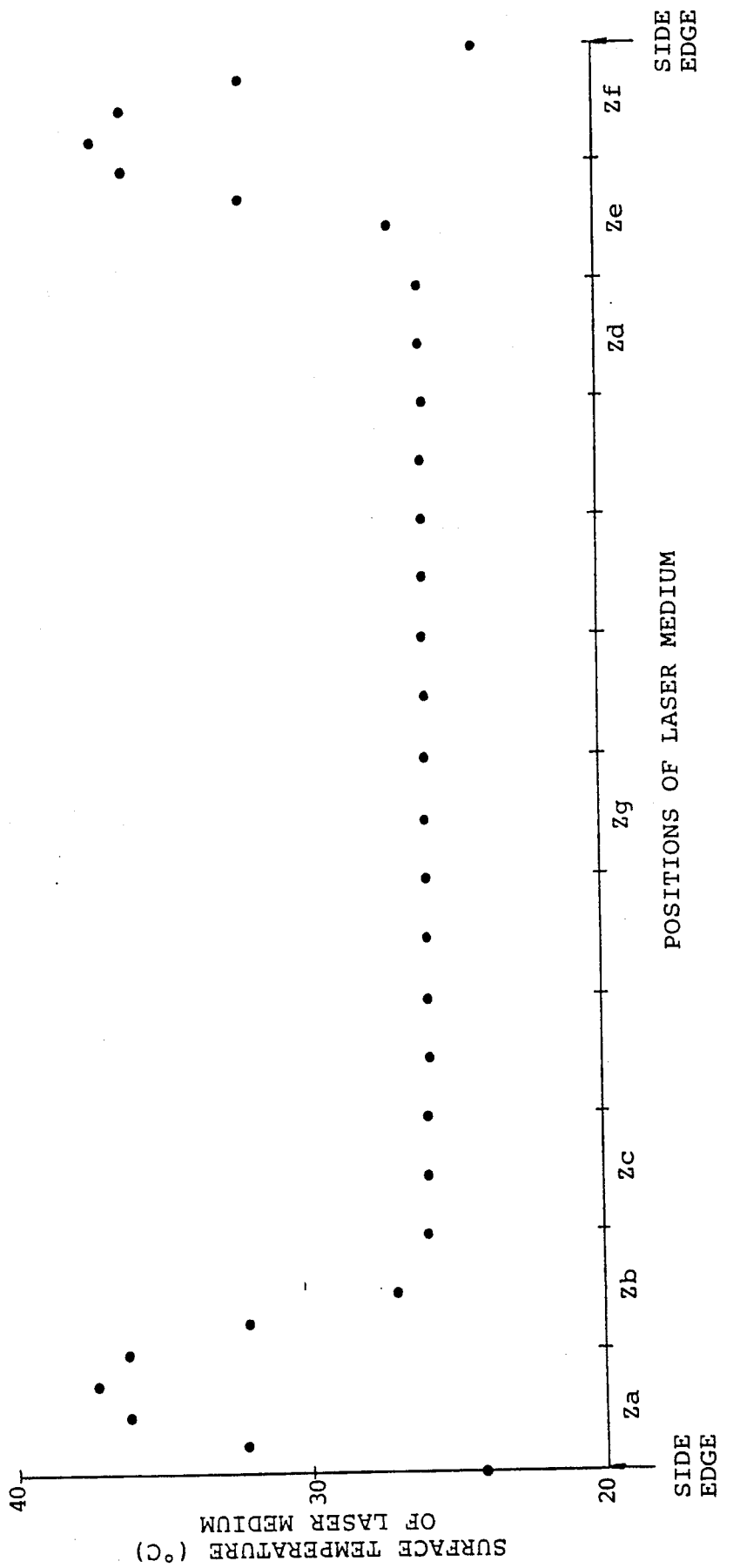
FIG. 6 shows a graphical representation for use in describing the temperature distribution of a conventional laser device.
Figure 7:
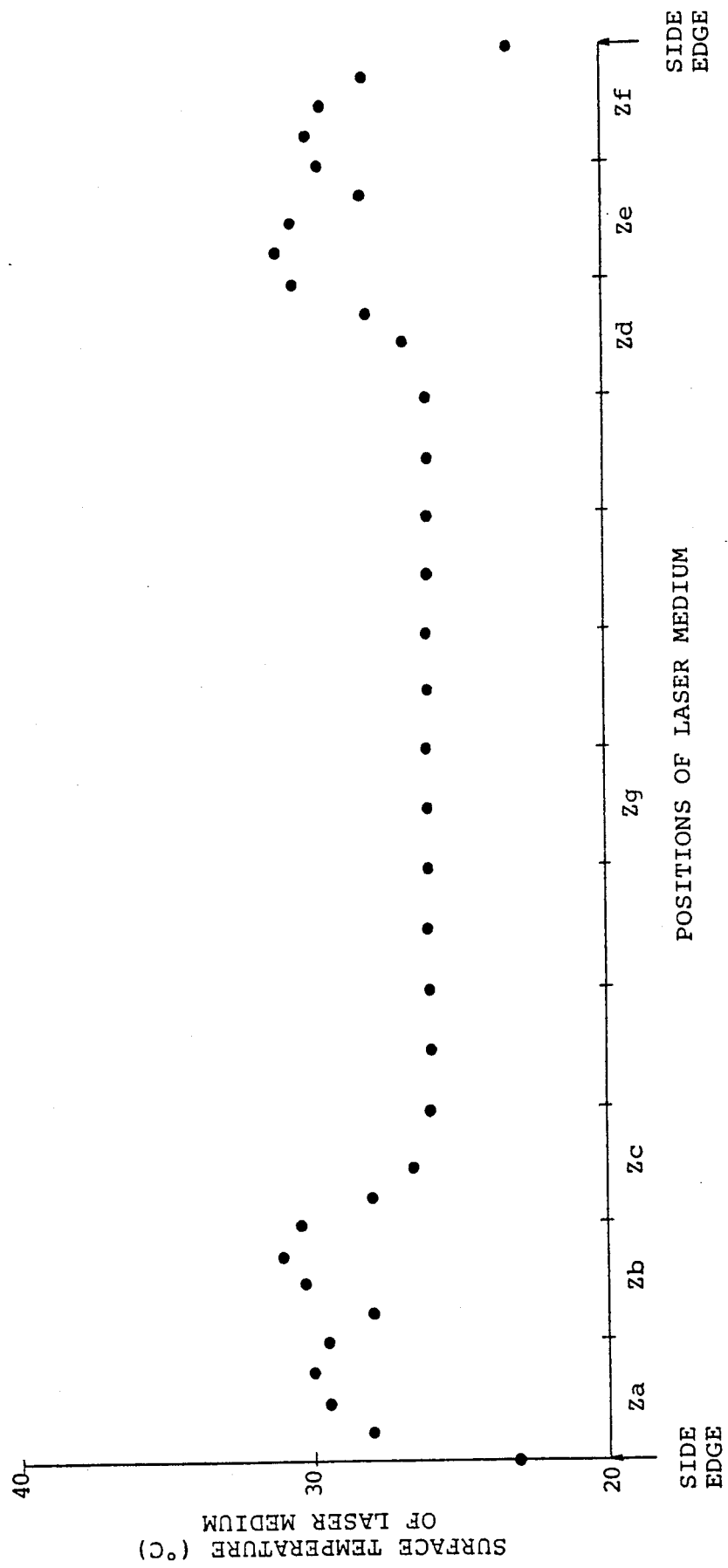
FIG. 7 shows a graphical representation for use in describing the temperature distribution of the laser device illustrated in FIGS. 1 through 3.

Referring to FIGS. 6 and 7, comparison will be made regarding the temperature distributions when a slab-shaped laser medium is excited by the conventional method mentioned in the background section of the instant specification and the above-mentioned reciprocating motion according to this invention. In FIGS. 6 and 7, surface temperatures (°C.) are measured to specify the temperature distributions, as shown along the ordinates of FIGS. 6 and 7. In this event, the slab-shaped laser medium has the same size as that illustrated with reference to FIGS. 1 through 3 and is divided into the partial zones as in FIG. 5. Therefore, the leftmost and the rightmost zones along abscissae of FIGS. 6 and 7 may be made to correspond to the edge zones Za and Zf illustrated in FIG. 5, respectively. Likewise, the remaining partial zones along the abscissae may be made to correspond to the partial zones Zb, Zc, Zg, Zd, Ze, Zf in the illustrated manner. In addition, the above-mentioned measurement is carried out under the following laser oscillation conditions:

Excitation energy: 600 Joules
Repetition pulses: 10 pulses per second (pps)

Excitation power: 6KW (=Excitation energy ×Repetition pulses)
Laser output: 120W (12J×10 pps)
Coolant (Water) temperature 15 (°C.)

It is noted that the conventional method reciprocates the slab-shaped laser medium without changing the amplitude of the reciprocating motion. According to the conventional method, the surface temperature on the slab-shaped laser medium is varied as shown in FIG. 6. Specifically, the surface temperature of the slab-shaped laser medium reaches about 38° C. at the edge zones Za and Zf while it is substantially kept at 26° C. on the remaining partial zones, such as Zb, Zc, Zg, Zd, and Ze. Thus, the surface temperature is varied between 26° and 38° C. A temperature difference is therefore equal to 12° C.

On the other hand, when the reciprocating motion is carried out according to this invention, the surface temperature on the slab-shaped laser medium is raised to 30° or 31° C. at the edge zones Za, Zb, Zf, and Ze with the remaining partial zones kept at 26° C. The temperature difference is 5° C. at most in the reciprocating motion according to this invention. Therefore, the temperature distribution illustrated in FIG. 7 is more uniform in comparison with that illustrated in FIG. 6.

In order to carry out the reciprocating motion according to this invention, the amplitude of the first cycle may be smaller than that of the second cycle in contrast with the above-mentioned example. In addition, the slab-shaped laser medium 21 may be at first driven to the edge zone Zf rightwards of FIG. 5 during the first cycle and thereafter to the edge zone Za leftwards.

In any event, it is possible for the laser device according to this invention to reduce the thermal distortion imposed on the slab-shaped laser medium 21 and to therefore increase the repetition frequency on pulse oscillation. This enables augmentation and stability of the laser output. Specifically, it is confirmed that a laser output of 300 Watts can be accomplished by the laser device according to this invention and is higher than the laser output of 200 Watts in the conventional laser device. A variation of the laser output can be restricted to a narrow range between plus 4% and minus 4% in spite of the fact that a variation of the laser output in the conventional device has a wide range between plus 20% and minus 20%.

Figure 8:
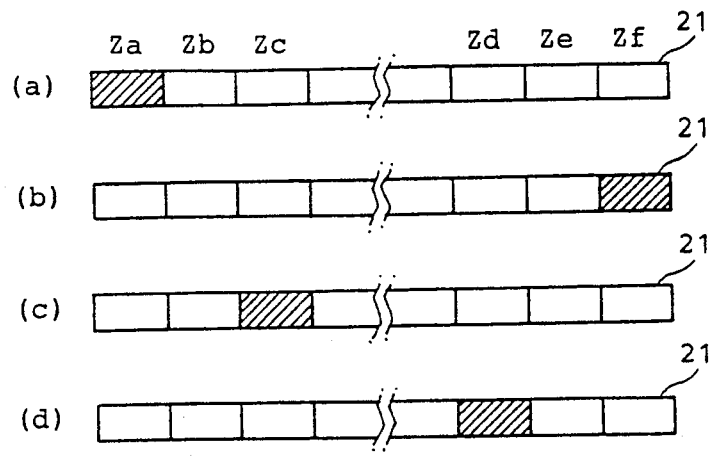
FIGS. 8(a) through (d) are schematic sectional views for use in describing the operation of a laser device according to a modification of this invention.

Referring to FIG. 8, a reciprocating motion will be illustrated which is carried out in a laser device according to a modification of this invention. As in FIG. 5, the illustrated reciprocating motion is divided into a first cycle and a second cycle following the first cycle. The slab-shaped laser medium 21 is reciprocated during the first cycle between the edge zones Za and Zf, as shown in FIGS. 8(a) and (b). The first cycle therefore has an amplitude identical with the amplitude of the first cycle illustrated in FIG. 5.

On the other hand, the slab-shaped laser medium is reciprocated during the second cycle between the partial zones Zc an Zd nearer to the center zone (Zg illustrated in FIG. 5) than the partial zones Zb and Ze, as illustrated in FIGS. 8(c) and (d). Therefore, the second cycle illustrated in FIG. 8 has an amplitude smaller than that of the second cycle shown in FIGS. 5(g) and (i).

Figure 9:
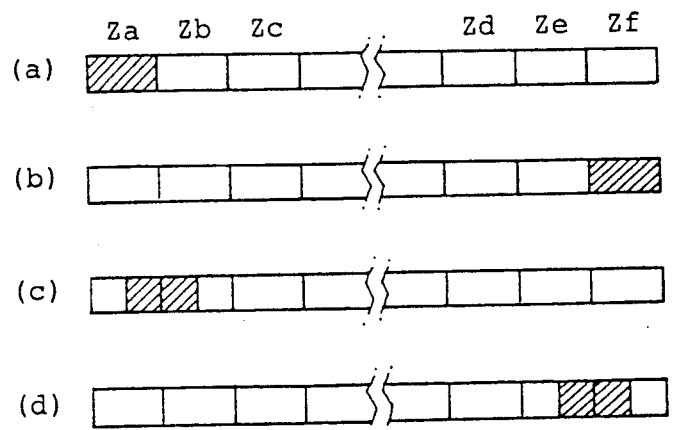
FIGS. 9(a) through (d) are similar views for use in describing the operation of a laser device according to another modification of this invention.

Referring to FIG. 9, another reciprocating motion is also divided into a first cycle illustrated in FIGS. 9(a) and (b) and a second cycle illustrated in FIGS. 9(c) and (d). the slab-shaped laser medium 21 is reciprocated during the first cycle illustrated in FIGS. 9(a) and (b) between the edge zones Za and Zf as in FIGS. 8(a) and (b). On the other hand, the slab-shaped laser medium 21 is reciprocated during the second cycle between intermediate zones including boundaries between two adjacent partial zones that may be, for example, Za an Zb, Ze and Zf, as shown in FIGS. 9(c) and (d).

Figure 10:
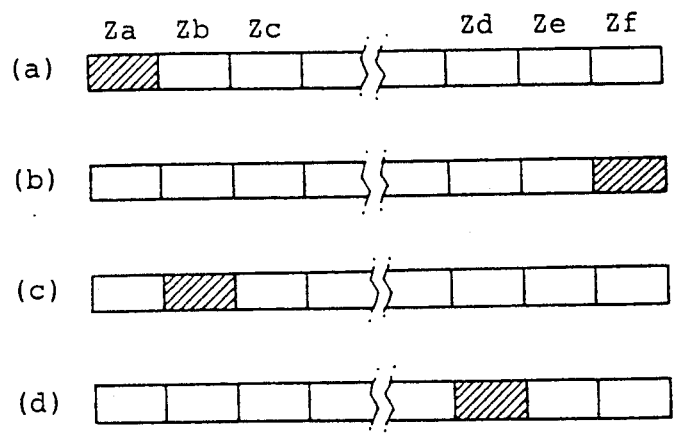
FIGS. 10(a) through (d) are similar views for use in describing the operation of a laser device according to another modification of this invention.

Referring to FIG. 10, a first cycle of a reciprocating motion has an amplitude determined by the distance between the edge zones Za and Zf, as illustrated in FIGS. 10(a) and (b), as in FIGS. 8 and 9. The amplitude of the first cycle is symmetrical with respect to the center zone. During a second cycle of the illustrated reciprocating motion, the slab-shaped laser medium 21 is driven to the partial zone Zb, as shown in FIG. 10(c) and is thereafter reversely driven from the partial zone Zb to the partial zone Zd, as symbolized by hatched lines in FIG. 10(d). This shows that the second cycle has amplitudes asymmetrical with respect to the center zone.

Although the first and the second cycles are alternatingly carried out during each reciprocating motion illustrated in FIGS. 5, 8, 9, and 10, the reciprocating motion may be made by reciprocating the slab-shaped laser medium 21 on the partial zones in the order of Za, Zf, Za, Zf, Zb, and Ze. This means that the edge zones Za and Zf are successively excited two times and the partial zones Zb and Ze are thereafter excited one time. Thus, the reciprocating motion mentioned above is reciprocated on the same zones two times and is thereafter reciprocated on different zones.

The reciprocating motion may be divided into more than two cycles. For example, first, second, and third cycles may be successively carried out in the order of the partial zones Za, Zf, Zb, Ze, Zc, and Zd and thereafter repeated in the above-mentioned order.

Figure 11:
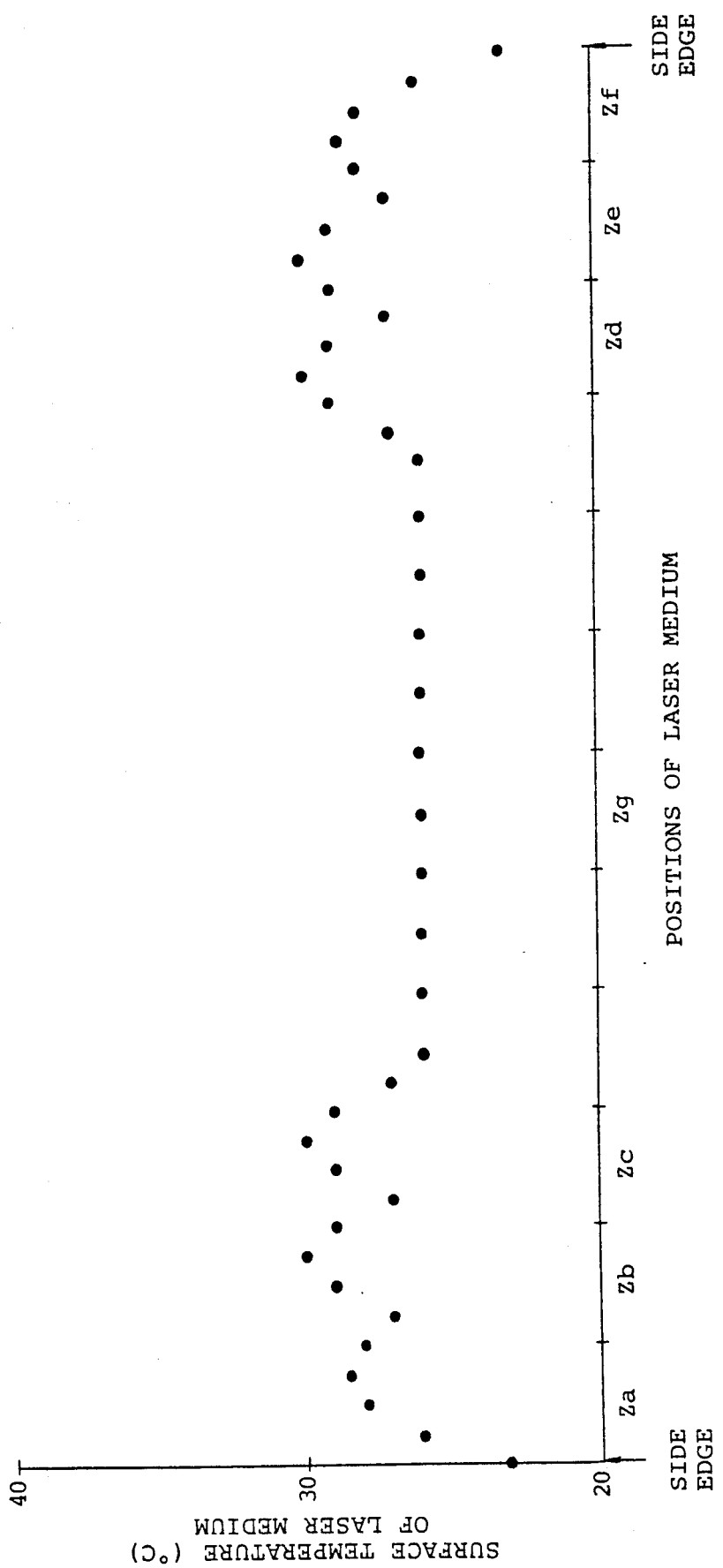
FIG. 11 is a graphical representation of a temperature distribution in a laser device according to the other modification of this invention.

Referring to FIG. 11, illustration is made regarding the temperature distribution of the same slab-shaped laser medium obtained when the first through third cycles are successively carried out in the above-mentioned manner. As is apparent from FIG. 11, the temperature distribution becomes relatively uniform in the slab-shaped laser medium.

While this invention has thus far been described in conjunction with a preferred embodiment thereof, it will readily be possible for those skilled in the art to put this invention into practice in various other ways. For example, the controller 55 may comprise a random number generator for generating a random number, instead of the counter 62 so as to switch turning points of the reciprocating motion from one to another in accordance with a random number generated by the random number generator. The laser device may be used not only for laser oscillation but also for laser amplification. In such laser amplification, the reflection mirror 51 and the translucent mirror 52 may not be used. The excitation member 22 may comprise a single excitation unit disposed along one of the principal surfaces. The slab-shaped laser medium 21 may be formed by a crystal in lieu of the laser glass. A linear motor, an air cylinder, or a hydraulic cylinder may be substituted for the servomotor 35. In addition, the excitation member 22 may be moved in the illustrated manner relative to the slab-shaped laser medium 21. Instead of counting the pulses, a time may be controlled in the controller 55.

What is claimed is:

1. A laser device for use in exciting a slab-shaped laser medium by an excitation member to produce a laser beam along a first predetermined direction, said slab-shaped laser medium having a pair of principal surfaces opposite each other, a pair of side surfaces parallel to each other and to said first predetermined direction, and a pair of light emission surfaces which extend along a second predetermined direction transverse to said first predetermined direction and which are contiguous with said principal surfaces and said side surfaces, said slab-shaped laser medium undergoing reciprocating motion along said second predetermined direction relative to said excitation member to produce said laser beam along said first predetermined direction, said reciprocating motion being specifiable by an amplitude from a center position of said slab-shaped laser medium along said second predetermined direction, said laser device comprising:

moving means coupled to a selected one of said slab-shaped laser medium and said excitation member for reciprocally moving said selected one of the slab-shaped laser medium and said excitation member relative to the other along said second predetermined direction; and control means coupled to said moving means for controlling said moving means to reciprocally move said selected one of the slab-shaped laser medium and said excitation member by said moving means in said second predetermined direction so that the amplitude of said reciprocating motion is variable, said control means comprising amplitude changing means for changing the amplitude of the reciprocating motion in subsequent cycles of the reciprocating motion.

2. A laser device as claimed in claim 1, wherein each of said cycles of said reciprocating motion has an amplitude different from the other cycles.

3. A laser device as claimed in claim 2, wherein the amplitude in a selected one of said cycles is asymmetrical with respect to said center position.

4. A laser device as claimed in claim 2, said slab-shaped laser medium being divisible along said second predetermined direction into a plurality of partial zones which include edge zones nearest to said side surfaces, respectively, wherein said edge zones are intermittently excited by said excitation member during a selected one of said cycles.

5. A laser device as claimed in claim 1, wherein said moving means moves said slab-shaped laser medium.

6. A laser device as claimed in claim 1, wherein said moving means moves said excitation member.

7. A laser device as claimed in claim 1 wherein said moving means produces reciprocal motion in each cycle between said laser medium and said excitation member of relatively constant speed between turning point regions of said reciprocal motion.

8. A method of exciting a slab-shaped laser medium by an excitation member to produce a laser beam along a first predetermined direction, said slab-shaped laser medium having a pair of principal surfaces opposite each other, a pair of side surfaces parallel to each other and to said first predetermined direction, and a pair of light emission surfaces which extend along a second predetermined direction transverse to said first predetermined direction and which are contiguous with said principal surfaces and said side surfaces, said slab-shaped laser medium undergoing a reciprocating motion along said second predetermined direction relative to said excitation member to produce said laser beam along said first predetermined direction, said reciprocating motion being specifiable by an amplitude from a center position of said slab-shaped laser medium along said second predetermined direction, said method comprising the steps of:

producing a sequence of control signals so that the amplitude of said reciprocating motion becomes variable; and reciprocally moving said selected one of the slab-shaped laser medium and said excitation member relative to the other along said second predetermined direction in response to said control signal sequence for changing said amplitude of the reciprocating motion in subsequent cycles of said reciprocating motion.

9. A method as claimed in claim 8, wherein each of said cycles of said reciprocating motion has an amplitude different from the other cycles.

10. A method as claimed in claim 9, wherein the amplitude in a selected one of said cycles is asymmetrical with respect to said center position.

11. A method as claimed in claim 9, said slab-shaped laser medium being divisible along said second predetermined direction into a plurality of partial zones which include edge zones nearest to said side surfaces, respectively, wherein said edge zones are intermittently excited by said excitation member during a selected one of aid cycles.

12. A method as claimed in claim 8 wherein said reciprocal motion between said laser medium and said excitation member is effected at relatively constant speed in each cycle between turning point regions of said reciprocal motion.

* * * * *